United States Patent [19]

Batcheller

[11] 4,286,372
[45] Sep. 1, 1981

[54] METHOD OF ERECTION OF PIPE RAIL JOINTING SYSTEM

[75] Inventor: Roy W. Batcheller, West Covina, Calif.

[73] Assignee: CraneVeyor Corporation, South El Monte, Calif.

[21] Appl. No.: 94,711

[22] Filed: Nov. 16, 1979

[51] Int. Cl.³ .................. B21D 39/00; B23P 11/00
[52] U.S. Cl. ........................................ 29/516; 72/410;
29/283.5; 29/282; 256/65; 285/382.2
[58] Field of Search ................... 29/516, 282, 155 R,
29/283.5; 256/24, 65; 285/382.2; 72/410

[56] References Cited

U.S. PATENT DOCUMENTS

| 470,514 | 3/1892 | Simpson | 256/65 |
|---|---|---|---|
| 505,781 | 9/1893 | Vance | 256/65 |
| 2,090,863 | 8/1937 | Feykert | 256/65 UX |
| 2,813,330 | 11/1957 | Schmerheim | 29/516 UX |
| 2,950,015 | 8/1960 | Pataky | 256/65 UX |
| 3,332,272 | 7/1967 | Tonchen | 29/516 X |
| 3,787,033 | 1/1974 | Snyder et al. | 256/65 X |
| 3,853,203 | 12/1974 | Werner et al. | 256/65 X |
| 3,901,481 | 8/1975 | Probst | 256/65 X |

Primary Examiner—Charlie T. Moon
Attorney, Agent, or Firm—Vernon D. Beehler

[57] ABSTRACT

A tubular pipe rail jointing system consisting of posts and rails makes use of fittings on the posts providing sleeves into which ends of the tubular pipe rails are telescopingly received. For effective fabrication and erection it is preferable to cut the tubular pipe rails to proper length on the site. To assure a rugged installation, a dimple is pressed into the sleeve with a pressure punch of special construction. A cradle forming part of the tool fits around half the circumference of the sleeve while the punch under high pounds per square inch pressure is pressed progressively into the sleeve, at a point diametrically opposite the cradle, until material of the sleeve, deformed by the punch, is forced into a depression formed simultaneously in the end of the tubular pipe rail. The assembly described becomes interlocked by what has been termed a swedge lock.

1 Claim, 7 Drawing Figures

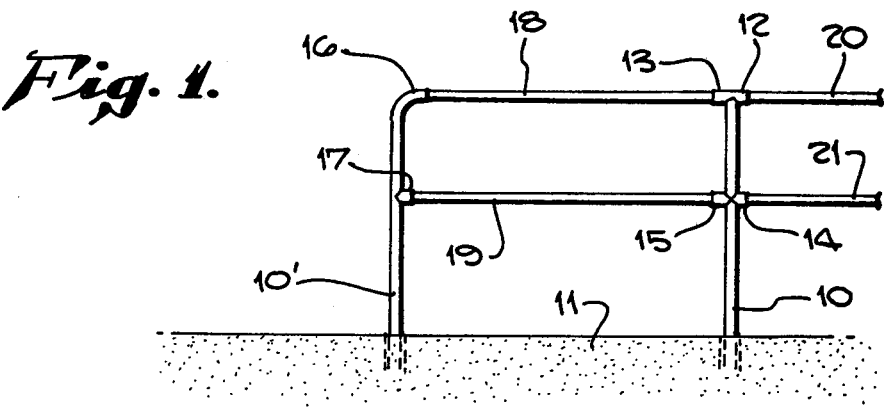
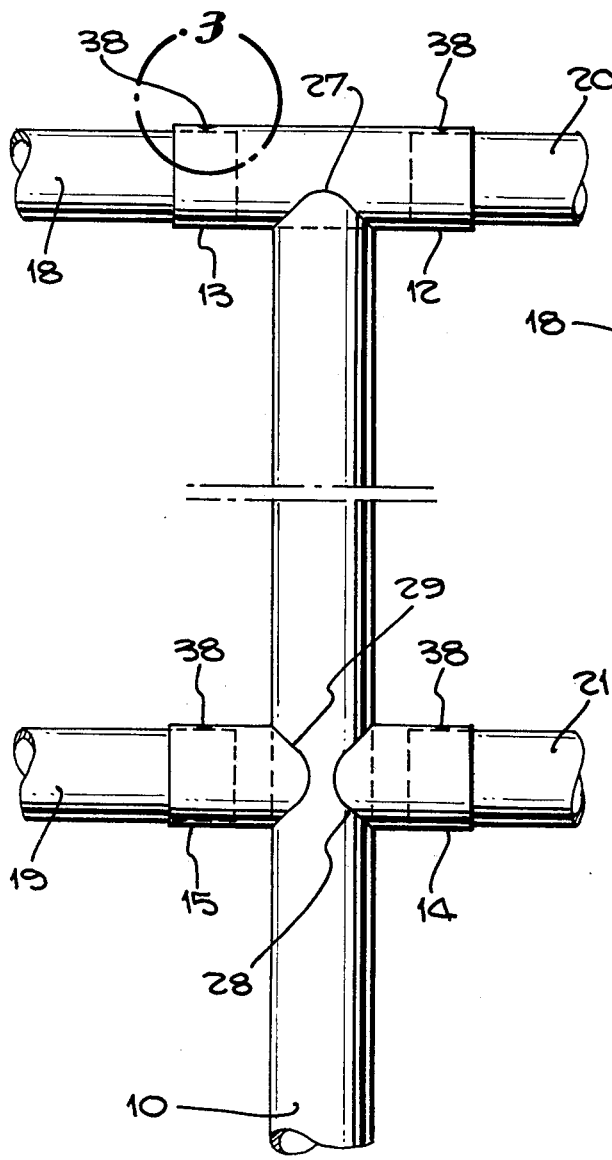
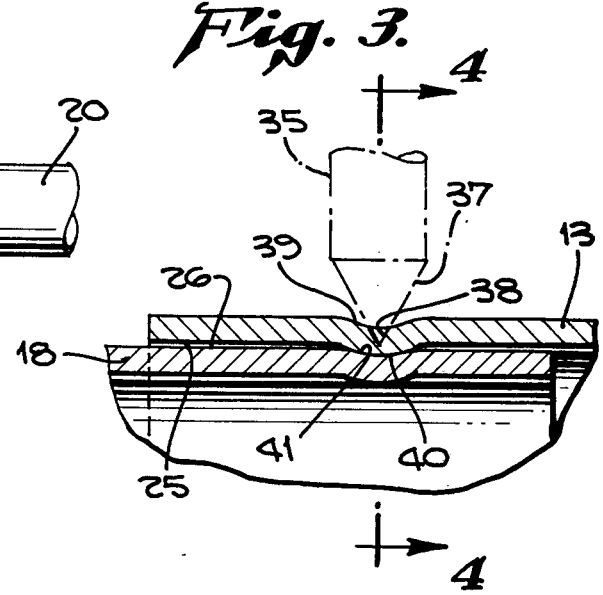
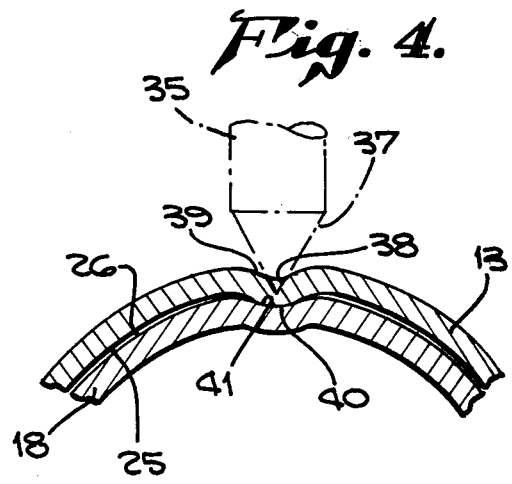

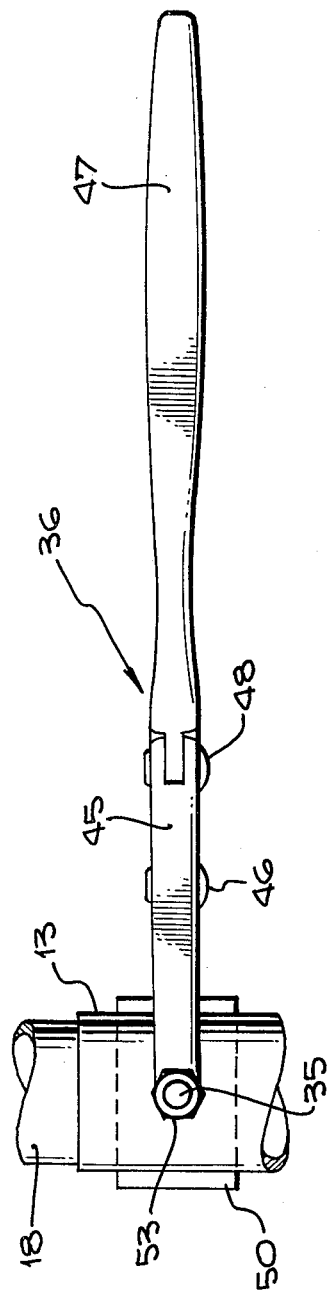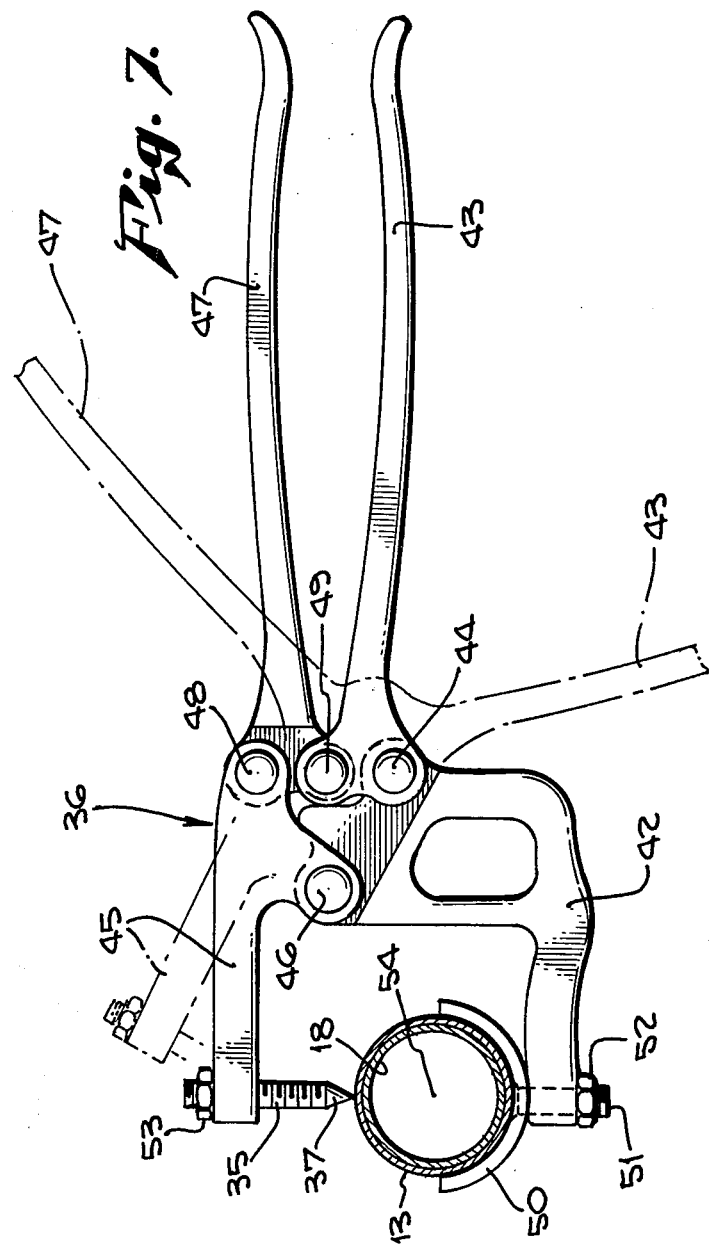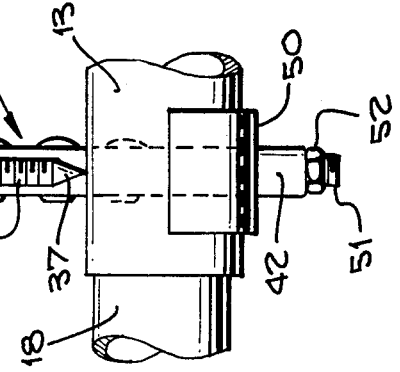

METHOD OF ERECTION OF PIPE RAIL JOINTING SYSTEM

Guard rails of a currently popular type, commonly referred to as a pipe handrail system, consist of posts set in concrete, the posts being provided with fittings or sleeves for reception of pipe rails which extend from one post to another. Depending upon the needs of a particular installation, the number of pipe rails between two adjacent posts may vary, but a top rail and an intermediate rail are usually found to be sufficient. For a more clean-cut looking installation, posts and rails may comprise stainless steel tubing with rails telescopingly engaging sleeves on the posts. In installations of such character, the sleeves may be relatively light gauge material. The system can be built post by post with rails inserted progressively. This applies whether the site may be level or may consist of a ramp or staircase.

It is among the objects of the invention to provide a new and improved pipe rail jointing system which makes use of swedge locked joints where pipe rails join the posts, such joints being made on the site.

Another object of the invention is to provide a new and improved pipe rail jointing system which is appreciably flexible, permitting the pipe rails to be cut to length on the site with jointing being provided so that the system can accommodate itself to changes on the site which may not have been anticipated.

Still another object of the invention is to provide a new and improved pipe rail jointing system which makes use of hand tools for swedge locking the joints.

Further among the objects of the invention is to provide a new and improved pipe rail jointing system wherein, although pipe rails may be cut to fit on the site, posts can be prefabricated with sleeves fitted at conventional elevation, thereby minimizing both fabrication and erection costs as well as minimizing production of scrap.

Still another object of the invention is to provide in a pipe rail jointing system a tool which can be readily adjusted to the size of the pipe and sleeves and the material of which such are fabricated, in order to assure effective penetration and a tight joint in each instance.

Also included among the objects of the invention is to provide in a pipe rail jointing system a tool productive of continuous controlled pressure in a proper direction after the pipe rails have been assembled with the sleeves on the posts so that the entire system need not be tightened in position until after assembly and after careful adjustment of the posts and rails with respect to each other.

With these and other objects in view, the invention consists of the construction, arrangement, and combination of the various parts of the device, serving as an example only of one or more embodiments of the invention, whereby the objects contemplated are attained, as hereinafter disclosed in the specification and drawings, and pointed out in the appended claims.

FIG. 1 is a side elevational view of a fragment of the pipe handrail system in erected position.

FIG. 2 is a fragmentary side elevational view of one of the posts with ends of pipe rails connected.

FIG. 3 is an enlarged sectional view on the circular line 3—3 of FIG. 2.

FIG. 4 is a fragmentary sectional view on the line 4—4 of FIG. 3.

FIG. 5 is a plan view of the tool as applied to the system.

FIG. 6 is an end view of the tool as applied to the system.

FIG. 7 is a side elevational view of the tool, showing a fragment of the system in section.

In an embodiment of the invention chosen for the purpose of illustration, the system is shown as including conventional posts 10 and 10', two having been selected for illustration, and shown embedded at the site in a concrete deck 11. For the post 10, sleeves 12 and 13 are provided, forming in effect a T-fitting at the top of the post. Additional sleeves 14 and 15 immediate the top and bottom of the post comprise, in effect, a cross-fitting. Similarly, for the post 10', there are provided sleeves 16 and 17, respectively, at the top and intermediate portions of the post. Sleeves 13 and 16 accommodate a pipe rail 18. Another pipe rail 19 is accommodate by sleeves 15 and 17. Additional pipe rails 20 and 21 engage respective sleeves 12 and 16, the next adjacent post not being shown. The posts, sleeves and rails, when assembled, comprise a pipe handrail assembly which it is the object of the jointing system to construct.

As shown in greater detail in FIGS. 2, 3 and 4, the sleeve 13 has a cylindrical interior wall 25 of a diameter such as to slideably accommodate the exterior cylindrical wall 26 of the pipe handrail 18. The rail 18 is made long enough so that there is a substantial overlap of the sleeve 13 with the end of the rail 18 as long, or longer than half the diameter of the sleeve 13. In the embodiment shown, all sleeves are the same diameter and thickness, and the rails also are of uniform diameter and thickness.

Clearly, in view of the construction shown, the posts with sleeves attached may be fabricated at the factory, the sleeves 12 and 13 being joined to the post 10 along a welded line 27. Where the sleeves and posts are of comparable diameters there can be a clear way from end to end of the cylindrical interior wall 25. The same comment is applicable to the welded lines 28 and 29 along which respective sleeves 14 and 15 are joined to the post 10. Under such circumstances, raiis can be shifted horizontally into a desired position of adjustment. Such would make possible positioning all posts simultaneously and then cutting the rails to desired length, after which they are slid into one or another of the sleeves far enough to clear the opposite end of the rail. The opposite end is then slid into its corresponding sleeve. With this procedure, the cutting of rails can be deferred until all posts are positioned at the site and centerline distances become established. The rails can be measured and then cut precisely to the desired length, with a minimum of scrap. Since the spacing of posts may vary from time to time at the site to accommodate structural conditions not anticipated, by deferring cutting of the rails until the posts are set, a precise rail length can be determined. Where this erection procedure is not followed, posts can be set progressively one at a time, the rails then inserted, and the next succeeding post placed in position receiving the rail and after which it is anchored in place on the site. For a firm, rugged joint at the fitting, namely, the junction of the rail with the sleeve, the overlap should preferably be in excess of one-half the diameter of the sleeve.

With the posts all properly set in place and the rails in position, it may become desirable to recheck verticality of the posts, and the endwise adjustment of the rails in the sleeves. Although, when posts are initially set, they should be vertical and should they become tilted to any slight degree, as possibly by something striking against them, it may be expedient to rebend them slightly to precise vertical position. Following insertion of the rails in the sleeves, they can be shifted endwise to a degree so that the overlap at opposite ends is approximately equal, this signifying that there will be adequate stiffness at the joints and ample opportunity to create the swedge lock at the fitting between the sleeve and the rail.

To create the swedge lock, a punch 35 is employed, made as part of a tool 36, appropriately referred to as a toggle dimpling tool. The punch 35 is provided with a relatively sharp, hardened, penetrating point 37 which is designed to have pressure applied to it by manipulation of the tool 36 to press it into the position shown in FIGS. 3 and 4. Properly applied pressure causes the hardened point to penetrate the wall of the sleeve 13, as shown in FIGS. 3 and 4, creating a hollow frusto-conical depression 38. Action as described creates additionally a shallow dimple 39 in the outside surface of the rail 13 and simultaneously causes the formation of a rounded projection 40 on the opposite side of the sleeve. The force creating the projection is sufficiently great so as to create a rounded depression 41 in the outside surface of the rail 18 sufficient to interlock the rail in the sleeve. The interconnection of projection and depression just described creates the desired swedge lock between the parts. Creation of the swedge lock can be deferred until all parts, rails, sleeves and posts are in desired alignment and relationship to each other and the final swedge locking operation then applied, either successively to the different sleeves or at various areas simultaneously by manipulation of more than one punch.

To secure the necessary movement and accompanying pressure needed by the punch 35 to create the complementary projections and depressions, the toggle-acting dimpling tool 36 is specially constructed. One jaw 42 has a handle 43 pivoted with respect to it about a pivot point 44. A second jaw 45 has a pivot connection 46 to the jaw 42. A handle 47 has a pivot connection 48 to the jaw 45. The handles 47 and 43 are pivotally interconnected by means of a pivot connection 49. The toggle action just described is of substantially conventional construction.

In the tool of special construction here under consideration, there is provided for the jaw 42 a saddle 50 on a threaded shank 51 which is in threaded engagement with the jaw 42. In this fashion the position of the saddle 50 can be adjusted to a degree and anchored in position by a lock nut 52.

As appears in FIGS. 5 and 6, the saddle 50 has a length something in excess of the diameter of the sleeve 13, sufficient to approximately equal the overlap between the rail 18 and the sleeve 13 at the joint. The saddle is semi-cylindrical with an inside radius substantial equal to the radius of the sleeve 13.

In contrast, the punch 35, previously made reference to, is mounted on the jaw 45 and has a threaded engagement with the jaw. The lock nut 53 is employed to anchor the punch in its adjusted position.

It is of significance that the longitudinal center line of the punch 35 passing through the extremity of the point 37 is in alignment with the concentric longitudinal center line 54 of the sleeve 13 and rail 18. in that relationship, when pressure is applied to the punch 35, by manipulation of the handles 43 and 47, the line of action is in a radial direction with respect to the sleeve and rail whereby to similarly align the depression 38, the rounded projection 40 and rounded depression 41, previously made reference to.

The mechanical advantage built into the tool by the leverage described is one to generate considerable pounds per square inch pressure on the relatively sharp, hardened point 37 for a short distance sufficient to penetrate and create the depressions. Once the depressions have been created and the action of the handles 43 and 47 reversed, the punch can be quickly withdrawn an appreciable distance, as suggested by the broken line representation of FIG. 7, permitting the tool to be moved to the next sleeve and rail connection where another swedge lock is to be created.

Provision of a saddle of the shape and size shown and described maintains the shape of the sleeve and rail while during the work stroke the swedge lock is being created. Although there may be a minor flattening deformation during the work stroke, there is sufficient resiliency and elasticity in the sleeve and rail to have them return to normal round configuration after pressure has been released. Enough dimpling action has been created by reason of the snug sliding fit to form a tight, rugged, immovable swedge lock once the action has been completed.

Because of the compactness and portability of the tool, each sleeve in turn can be thus locked to the rail while all parts of the system are held in substantially perfect alignment. Should the system be a large one, the tools are sufficiently portable that a number can be used simultaneously on the same installation. Further still, by having the pressure applied with a pressing action, the tool can be manipulated with care while a great concentration of pressure in pounds per square inch is applied to the point of the punch, the work stroke distance being relatively short, as suggested by the degree of penetration of the point in FIGS. 3 and 4, Further still, in view of the great concentration of pressure being needed at only the precise location, adjustment of the saddle 15 and of the punch 35 can be carefully made to fit an individual circumstance, depending, on occasion, on the tolerances permitted with respect to the sleeves and rails being employed.

Although location of the swedge lock is shown on the top of the sleeve in the drawings, it will be understood that the swedge lock can be as readily made on the bottom side or on occasions on that side obscured from view where a clean, rounded, exterior appearance is preferred. The ready portability of tools acting in the manner shown makes on-site installation including cutting of the rails to appropriate length expressly for a tight-fitting, effective and economical installation.

While a particular embodiment of the present invention has been shown and described, it will be obvious to those skilled in the art that changes and modifications may be made without departing from the invention in its broader aspects, and therefore, the aim of its appended claims is to cover all such changes and modifications as fall within the true spirit and scope of the invention.

Having described the invention, what is claimed as new in support of Letters Patent is as follows:

1. A method for erection on the site of a pipe rail jointing system comprising posts for successive vertical attachment to the site at horizontally spaced intervals, said posts having horizontal sleeves extending radially outward from exterior faces of said posts in a horizontal direction, and rails for engagement with said sleeves at respective ends of the rails, said method comprising cutting said rails at the site to respective lengths greater than the distance between respective sleeve ends to provide an overlap in the sleeve of about twice the rail diameter and a length less than the distance between faces of the posts on which the respective sleeves are located, adjusting posts and rails with respect to each other in final position, and attaching each sleeve to the adjacent end of the respective rail by progressively pressing a punch with a pointed end into the sleeve at the overlap portion while supporting the sleeve on the side opposite the punch throughout about one-half the circumference, thereby forming a shallow rounded depression on the outside of the pipe rail receptive of a complementary portion of the sleeve and a sharp depression on the outside of the sleeve in diametrical alignment with said depression and at the location of the punch whereby to anchor the pipe rails to the posts as an assembly at the site.

* * * * *